United States Patent [19]

Yokohama et al.

[11] Patent Number: 4,869,570
[45] Date of Patent: Sep. 26, 1989

[54] FIBER COUPLER AND METHOD AND APPARATUS FOR MANUFACTURING THE SAME

[75] Inventors: Itaru Yokohama, Kanagawa; Kazunori Chida, Tokyo; Juichi Noda, Ibaraki; Hiroaki Hanafusa, Ibaraki; Yoshiaki Takeuchi, Ibaraki; Mitsuhiro Tateda, Ibaraki, all of Japan

[73] Assignee: Nippon Telegraph and Telephone Corporation, Tokyo, Japan

[21] Appl. No.: 158,256

[22] Filed: Feb. 19, 1988

[30] Foreign Application Priority Data

Feb. 21, 1987 [JP] Japan .................................. 62-38740
Feb. 21, 1987 [JP] Japan .................................. 62-38741
Nov. 5, 1987 [JP] Japan .................................. 62-278173

[51] Int. Cl.$^4$ .............................................. G02B 6/24
[52] U.S. Cl. .................................. 350/96.15; 350/96.16
[58] Field of Search ............... 350/96.15, 96.16, 96.20, 350/96.21, 96.22, 96.24; 156/158, 166; 29/419 R, 419 G, 514; 269/58

[56] References Cited

U.S. PATENT DOCUMENTS

| | | | |
|---|---|---|---|
| 4,360,248 | 11/1982 | Bickel et al. | 350/96.16 |
| 4,392,712 | 7/1983 | Ozeki | 350/96.16 |
| 4,400,055 | 8/1983 | Ozeki et al. | 350/96.15 |
| 4,707,062 | 11/1987 | Abe et al. | 350/96.16 |
| 4,726,643 | 2/1988 | Imoto et al. | 350/96.16 |

*Primary Examiner*—Frank Gonzalez
*Attorney, Agent, or Firm*—Blakely, Sokoloff, Taylor & Zafman

[57] ABSTRACT

A fiber coupler includes first and second optical fiber groups and a fused-elongated region. The first optical fiber group is obtained by parallelly arranging a plurality of optical fibers on a single plane, a coating of each of the optical fibers being removed throughout a predetermined portion at the same position as that of an adjacent optical fiber in a longitudinal direction. The second optical fiber group is obtained by parallelly arranging adjacent optical fibers on a predetermined plane parallel to an arrange plane of the first optical fiber group at the same pitch as that of the first optical fiber group, a coating of each of the optical fibers being removed throughout a predetermined portion at the same position as that of an adjacent optical fiber in a longitudinal direction as the first optical fiber group. The fused-elongated region is located at a portion of the predetermined portions from which the coatings are removed and obtained by fusing/elongating at least some optical fibers of the first optical fiber group with at least some optical fibers of the second optical fiber group so that corresponding optical fibers are fused/elongated. A plane including centers of two cores of the optical fibers fused with each other at the fused-elongated region is arranged substantially perpendicular to the arrange planes of said first and second optical fiber groups, and at least a portion of the first and/or second optical fiber groups is a fiber ribbon obtained by integrally forming a plurality of optical fibers each having a core and a clad by a coating.

6 Claims, 13 Drawing Sheets

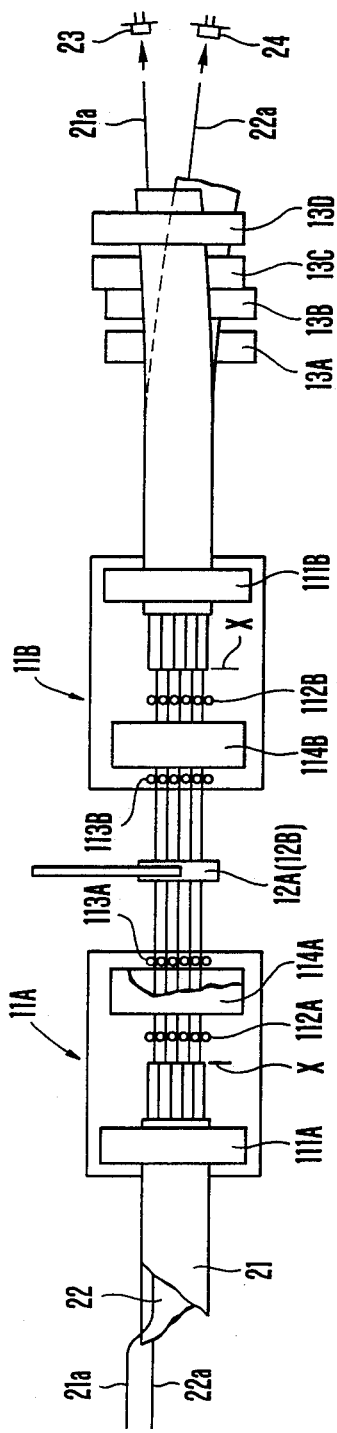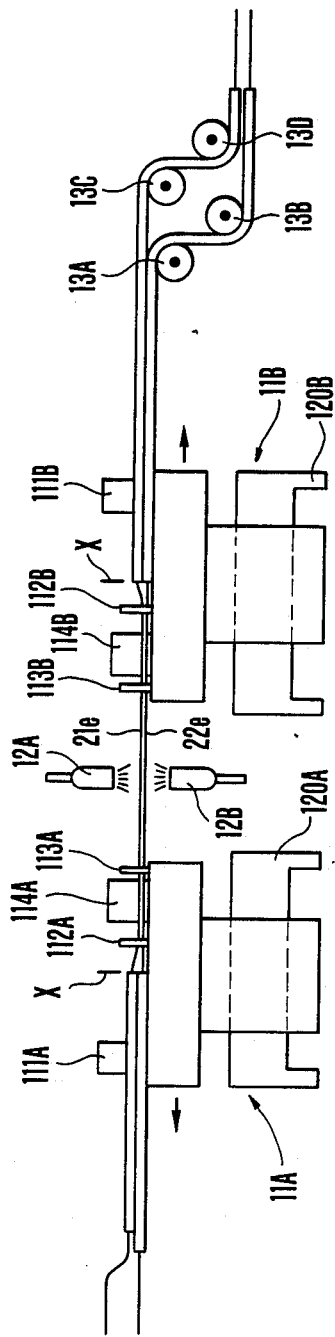
FIG.1(a)
FIG.1(b)

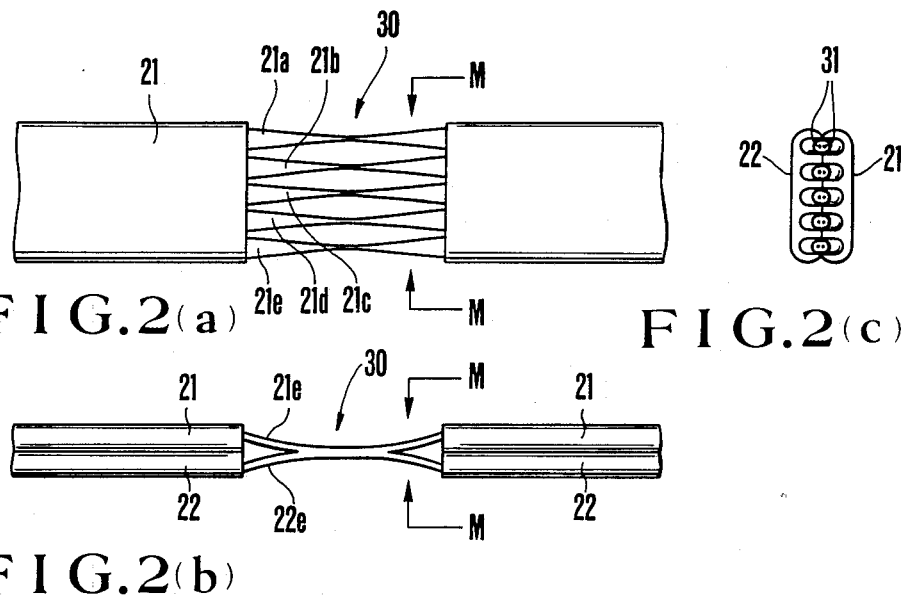
F I G.2(a)   F I G.2(c)
F I G.2(b)
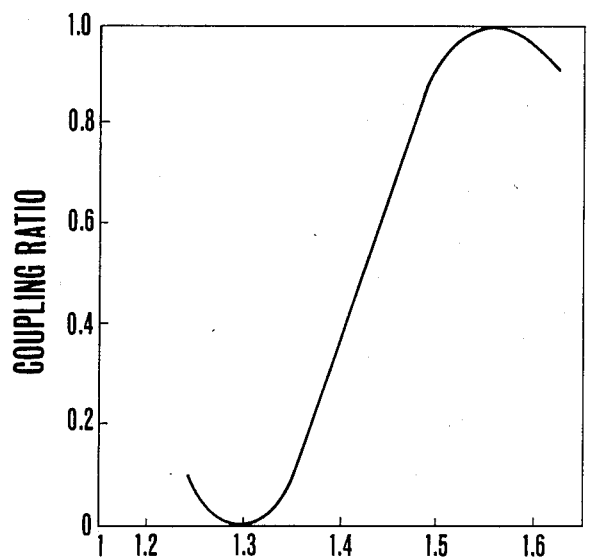
WAVE LENGTH (μm)   F I G.3

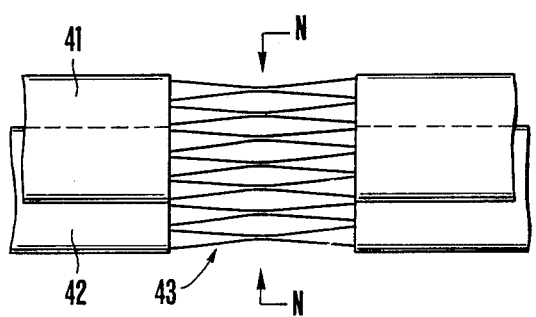
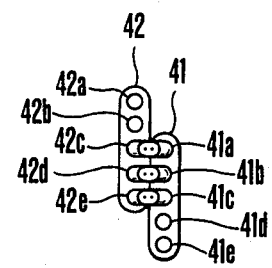
FIG.4(a)　　　　　FIG.4(b)
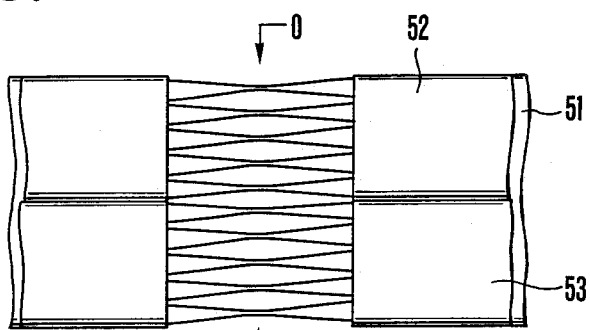
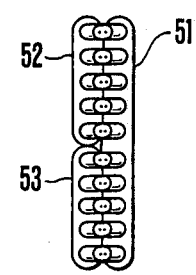
FIG.5(a)　　　　　FIG.5(b)
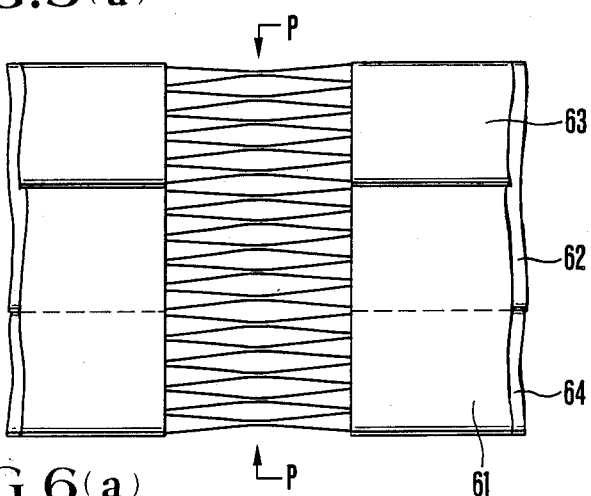
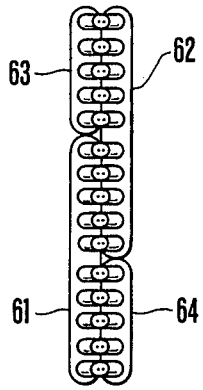
FIG.6(a)　　　　　FIG.6(b)

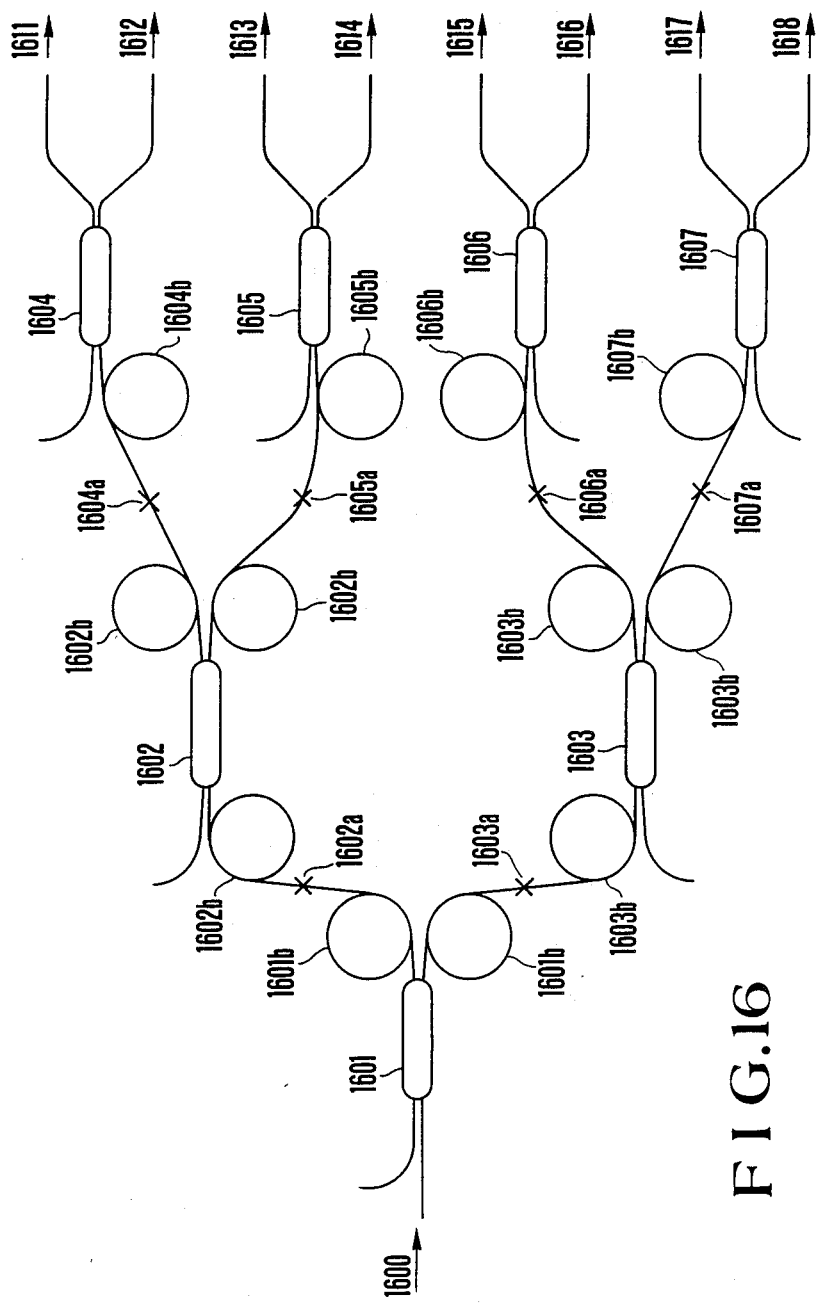

FIBER COUPLER AND METHOD AND APPARATUS FOR MANUFACTURING THE SAME

BACKGROUND OF THE INVENTION

The present invention relates to a novel fiber coupler and a method and apparatus for manufacturing the same and, more particularly, to a fiber coupler having uniform characteristics obtained by manufacturing a plurality of fiber couplers at the same time and a method and apparatus for manufacturing the same.

As optical signal transmission techniques have recently been developed, a number of optical communication systems or optical sensor systems have been proposed and put into practice. General signal transmission techniques aim at high density/high speed signal transmission, stability of characteristics of various elements, and low cost in the optical systems.

An example of systems for realizing high density signal transmission is a fiber ribbon which has been substantially put into practice in recent years. As shown in a sectional view of FIG. 13, this fiber ribbon is obtained by parallelly arranging on a single arrange plane a plurality of bared fibers each of which is formed by coaxially arranging a core 1301, a clad 1302, and a coating 1303, and by surrounding a resultant arrangement by an over coating 1304 to obtain an integral structure. Such a fiber ribbon physically increases density of transmission line per unit sectional area in an optical fiber cable, thereby physically improving transmission density of an optical signal.

When an optical fiber is to be used as a member for transmitting a signal, an optical coupler must be used to branch an optical signal transmitted through a single transmission line into a plurality of transmission lines or to mix two or more optical signals transmitted through a plurality of transmission lines into a single transmission line. An optical coupler having such functions is a member frequently used to construct a variety of optical systems utilizing an optical signal and at the same time a very important member. Especially a fiber coupler using an optical fiber can be easily coupled to an optical fiber which is widely used as an optical transmission line and hence has been used very frequently as various optical transmission systems have been developed.

An example of fiber couplers having a typical arrangement is a biconical tapered single-mode fiber coupler disclosed in Opt. Lett., Vol. 6, 1981, B. S. Kawasaki, K. O. Hill, and R. G. Lamont.

FIGS. 14(a) to 14(c) are views for explaining an arrangement and a manufacturing method of the above conventional fiber coupler. This fiber coupler is manufactured as follows.

That is, as shown in FIG. 14(a), two optical fibers 1401 and 1402 each consisting of only a core 1404 and a clad 1405, i.e., from which a coating is removed, are parallelly arranged to contact each other. Subsequently, as shown in FIG. 14(b), a central portion 1403a of the optical fibers 1401 and 1402 is heated so that the both fibers are fused at this position. Then, when tension is applied to the optical fibers 1401 and 1402 while heating a fused portion to maintain the optical fibers in a softening state, the optical fibers 1401 and 1402 are elongated at the central portion or fused region 1403a, and the cores 1404 move close to each other and hence transmission light leaks therebetween. As a result, an optical fiber as shown in FIG. 14(c) having a fused-elongated region 1403b as a light mixing/branching portion is obtained.

FIG. 15 is a schematic view showing an arrangement of an apparatus for manufacturing the above fiber coupler disclosed in Japanese Patent Application No. 59-88168.

This apparatus fuses and elongates two optical fibers at their central portions to manufacture a fiber coupler. As shown in FIG. 15, the apparatus comprises pairs of fixing tools 1503a-1503b and 1504a-1504b for fixing predetermined sections of optical fibers 1501 and 1502, respectively, and a pair of elongation stages 1505a and 1505b for performing position setting of a fused-elongated region of the optical fiber and giving tension to the optical fiber near the central portion of each of the optical fibers 1501 and 1502.

That is, the fixing tools 1503a-1503b and 1504a-1504b hold the optical fibers 1501 and 1502, respectively, so that the elongation stages 1505a and 1505b can give tension to the optical fibers as will be described below. The elongation stage 1505a has a pair of pins 1506a, and the elongation stage 1505b has a pair of pins 1506b. The pairs of the pins 1506a and 1506b are provided with a predetermined interval therebetween so that the optical fibers 1501 and 1502 are brought into contact with each other at their central portions. The elongation stages 1505a and 1505b comprise horizontal-position adjustment tools 1507a and 1507b movable in a horizontal direction perpendicular to the optical fibers 1501 and 1502, vertical-position adjustment tools 1508a and 1508b which hold the optical fibers 1501 and 1502 and are movable in a vertical direction perpendicular thereto, and temporary fixing tools 1509a and 1509b.

In this apparatus, two optical fibers 1501 and 1502, from which coatings are removed by a predetermined length, are fixed on the fixing tools 1503a-1503b and 1504a-1504b by relatively weak tension, respectively. The optical fibers 1501 and 1502 are held by the elongation stages 1505a and 1505b at substantially a central position between the fixing tools 1503a-1503b and 1504a-1504b. That is, position setting is performed such that the optical fibers 1501 and 1502 are brought into contact with each other in the same plane as that of the surface of the elongation stages 1505a and 1505b by the horizontal-position adjustment tools 1507a and 1507b and that torsion of the optical fibers 1501 and 1502 is prevented by the vertical-position adjustment tools 1508a and 1508b. The optical fibers 1501 and 1502 are fixed in this state by the temporary fixing tools 1509a and 1509b, and the central portions of the optical fibers 1501 and 1502 are fused by a heating tool (not shown). Subsequently, heating is continuously performed to maintain a softening state of the optical fibers 1501 and 1502, and the elongation stages 1505a and 1505b are separated from each other to apply tension to the optical fibers 1501 and 1502, thereby elongating the fibers.

Thus, the fiber coupler as shown in FIG. 14(c) is manufactured.

The above conventional fiber coupler must be manufactured with high accuracy. For example, a force applied on an optical fiber to fix or elongate it is maximally several grams per fiber, and a fused region length of the optical fiber is several millimeters. Factors such as torsion of the optical fibers adversely affect characteristics of the optical fibers. A load or accuracy to such extent is easily varied by friction between members which constitute the apparatus. Therefore, various adjustments must be performed to each optical fiber with high accuracy. However, it is practically impossible to perform such adjustments by only operation of the apparatus. Therefore, in an actual operation, a predetermined amount of light is injected from one end of an optical fiber and monitored at the other end thereof to fuse or elongate the fiber, thereby obtaining uniform characteristics of products.

However, as described above, a large number of fiber couplers are required to construct an optical system. Therefore, when the above operation is performed to each optical fiber, productivity of the fiber couplers is degraded, and manufacturing cost is disadvantageously increased. As a result, practicability of an optical fiber which is expected to take place of a metal cable in the near future is significantly degraded.

In addition, since the fused-elongated region of the fiber coupler is vulnerable to bending, the fused-elongated region must be fixed on a board such as a glass board so that bending or an external force does not act thereon before the fused and elongated fiber coupler is taken out from the fusing/elongating apparatus. However, when this operation is performed to each fiber coupler, productivity of the fiber couplers is degraded. In addition, a large space is required when the optical coupler is mounted in an optical system.

The above problems are significant when a device such as the fiber ribbon described above is used, resulting in not only low productivity of the fiber couplers but also inconvenience. That is, in order to apply the fiber couplers to a system using the fiber ribbon, an operation of manufacturing the fiber couplers in number corresponding to the number of fiber elements to be coupled must be repeatedly performed, and both ends of each fiber coupler must be coupled to cores of the fiber ribbons. In addition, since a slack is required for coupling the optical fibers and each fiber coupler includes a package, a large space must be provided to accommodate the fiber ribbons coupled by the fiber couplers.

Another example of systems in which a plurality of fiber couplers are used is a star coupler as shown in FIG. 16.

An optical fiber type star coupler shown in FIG. 16 is manufactured to branch an optical signal supplied from an input port 1600 equally into eight outputs 1611 to 1618. This coupler is obtained by coupling seven 3-dB fiber couplers 1601 to 1607. As shown in FIG. 16, the input port 1600 is an input port for the coupler 1601. Output ports of the 3-dB fiber coupler 1601 are coupled to next couplers 1602 and 1603 at coupling points 1602a and 1603a, respectively. Output ports of the 3-dB fiber couplers 1602 and 1603 are coupled to input ports of next 3-dB fiber couplers 1604, 1605, 1606, and 1607 at coupling points 1604a, 1605a, 1606a, and 1607a, respectively. The output ports of the 3-dB fiber couplers 1604, 1605, 1606, and 1607 serve as output ports of this star coupler. Note that since an optical signal supplied to the star coupler is attenuated by 3 dB in each 3-dB fiber coupler, light intensity obtained at the output ports 1611 to 1618 is reduced by at least 9 dB.

Since this star coupler is constituted by coupling seven 3-dB fiber couplers 1601 to 1607 by fusing as described above, a connection loss is produced at each of the coupling points 1601a to 1607a. For this reason, not only attenuation of an optical signal in the star coupler is increased but also variations are produced in optical outputs from the output ports 1611 to 1618 due to inevitable variations in connection losses at the coupling points.

In a coupling operation for manufacturing the above star coupler, slack fibers 1601b to 1607b of 30 cm or more must be used before and after the 3-dB fiber couplers 1601 to 1607, respectively. Since the slack fibers 1601b to 1607b remain after the star coupler is completed, a system using such the star coupler cannot be made compact. In addition, a load acting on the coupling points 1601a to 1607a caused by the slack fibers 1601b to 1607b tends to break the coupler near the coupling portion.

As described above, the conventional fiber coupler has poor productivity, operability, and compactness, and hence practical utilization of the fiber coupler to an optical fiber system is largely prevented.

SUMMARY OF THE INVENTION

It is, therefore, an object of the present invention to provide a novel fiber coupler, a plurality of which can be easily manufactured with uniform characteristics and which can be accommodated in a small space and a method and apparatus for manufacturing the same.

According to an aspect of the present invention, a method of manufacturing a plurality of fiber couplers at the same time can be realized by a fiber coupler comprising a first optical fiber group obtained by parallelly arranging a plurality of optical fibers on a single plane, a coating of each of the optical fibers being removed throughout a predetermined portion at the same position as that of an adjacent optical fiber in a longitudinal direction, a second optical fiber group obtained by parallelly arranging adjacent optical fibers on a predetermined plane parallel to the arrange plane of the first optical fiber group at the same pitch as that of the first optical fiber group, a coating of each of the optical fibers being removed throughout a predetermined portion at the same position as that of an adjacent optical fiber in a longitudinal direction as the first optical fiber group, and a fused-elongated region, located at a portion of the predetermined portions from which the coatings are removed, and obtained by fusing/elongating at least some optical fibers of first optical fiber group with at least some of the optical fibers of the second optical fiber group so that corresponding optical fibers are fused/elongated, wherein a plane including centers of two cores of the optical fibers fused with each other at the fused-elongated region is arranged substantially perpendicular to the arrange planes of the first and second optical fiber groups. As a result, there is provided a fiber coupler which can be housed in a small space.

The present invention can be suitably applied to a fiber coupler in which at least a portion of the first and/or second optical fiber groups is a fiber ribbon obtained by integrally forming a plurality of optical fibers each having a core and a clad by a protective coating.

In addition, the present invention is characterized in that a plurality of portions of the coating removed portion of the first and/or second optical fiber groups are portions of at least one continuous optical fiber. As a result, there is provided a system in which a plurality of fiber couplers are continuously coupled, e.g., a compact star coupler with no connections.

According to another aspect of the present invention, there is provided a method of manufacturing a fiber coupler comprising the steps of: arranging a plurality of optical fibers, coatings of which are removed throughout predetermined portions at the same position in a longitudinal direction to expose bared fibers so that portions of the exposed bared fibers are arranged parallel to each other on a single plane, thereby forming a first optical fiber group; arranging a plurality of optical fibers, coatings of which are removed throughout predetermined portions at the same position in the longitudinal direction as that of the first optical fiber group to expose bared fibers on a predetermined plane parallel to the arrange plane of the first optical fiber group so that portions of the exposed bared fibers are aligned parallel to the portions of exposed bared fibers of the first optical fiber group at the same pitch, thereby forming a second optical fiber group; bringing corresponding bared fibers of the first and second optical fiber groups into contact with each other so that a plane including core centers of both the bared fibers is arranged substantially perpendicular to the arrange planes of the first and second optical fiber groups, and heating portions of the bared fiber groups in the longitudinal direction of the first and second optical fiber groups to fuse the corresponding bared fibers of the first and second optical fiber groups; and heating and elongating the fused regions while applying tension to the fused regions, thereby forming a plurality of fiber couplers at the same time.

According to still another aspect of the present invention, there is provided an apparatus for manufacturing a plurality of fiber couplers by connecting portions where bared fibers are exposed by removing coatings of corresponding optical fibers of first and second optical fiber groups, comprising first holding means for holding the exposed bared fiber portions of the first optical fiber group parallel to each other at a predetermined pitch on a single plane, second holding means for holding the exposed bared fiber portions of the second optical fiber group to be aligned parallel to the exposed bared fiber portions of the first optical fiber group at the same pitch, contacting means for bringing the corresponding exposed bared fiber portions of the first and second optical fiber groups into contact with each other so that a plane including core centers of both the bared fibers is substantially perpendicular to the arrange planes of the first and second optical fiber groups, heating/fusing means for heating and fusing the contacted bared fibers of the first and second optical fiber groups, and elongating means for elongating the fused bared fibers, wherein a plurality of fiber couplers are formed at the same time.

According to a preferred embodiment of the present invention, the first and second holding means include a pair of stages having flat upper surfaces, positioned on the same plane, for holding the optical fiber groups, respectively, and include a pair of bases which can be moved relative to each other in an axial direction of the optical fiber groups held on the upper surfaces.

According to another preferred embodiment of the present invention, the first and second holding means are constituted by fixing means for fixing portions of the optical fiber groups on the pair of stages in association with the stages, and the contacting means is constituted by holding means for pushing downward and holding the optical fiber groups on the upper surfaces of the pair of stages.

According to still another embodiment of the present invention, the above heating/fusing means is constituted by heating means, arranged at an intermediate position of the pair of stages and extending parallel to an arrange plane of the optical fiber groups held on the stages and perpendicular to an axial direction of the optical fiber groups, for simultaneously heating the optical fiber groups held on the stages at the same position in the longitudinal direction.

According to still another embodiment of the present invention, holding means for holding bared fibers of the first and second optical fiber groups to be separated from each other at a predetermined interval is provided on the upper surface of each of the pair of stages.

According to still another embodiment of the present invention, the above elongating means includes a pair of stages having flat upper surfaces at the same level for holding the first and second optical fiber groups thereon and movable relative to each other in an axial direction of the optical fiber groups held thereon, and fixing means for fixing the fused first and second optical fiber groups on the pair of stages.

According to the present invention, by manufacturing a plurality of optical fibers at the same time, a plurality of fiber couplers having uniform characteristics can be manufactured at the same time. In other words, a plurality of products having uniform characteristics can be obtained from the fiber couplers manufactured in accordance with the present invention by a simple operation to be described below.

That is, according to a fiber coupler manufacturing method of the present invention, two optical fiber groups parallelly positioned on a single plane are brought into contact with each other. Then, the contacted optical fiber groups are heated and fused/elongated. Therefore, since various factors according to these operations such as a side pressure or tension uniformly act on all the optical fibers, variations in the factors are reduced, and the manufactured fiber couplers have substantially the same characteristics.

In addition, the fusing/elongating operation which is most time-consuming in manufacture of the fiber coupler is performed at the same time. Therefore, a time required for manufacturing a plurality of fiber couplers is largely reduced to realize high productivity.

Moreover, the above-mentioned fiber ribbon can be used as a material for the fiber coupler. In this case, characteristics of a plurality of fiber couplers manufactured at the same time can be further uniformed. This is because the fiber ribbon is obtained by integrally arranging a plurality of bared fibers having uniform characteristics and a problem of torsion acting at a fused region of each bared fiber is already solved when the bared fibers are formed into the fiber ribbon. The fiber coupler manufactured using the fiber ribbon is a novel element which can couple a plurality of the bared fibers of the fiber ribbon at the same time. Therefore, the fiber ribbon can be easily coupled, which cannot be performed by the conventional fiber coupler.

The optical fiber star coupler according to the present invention has the same arrangement as that of the conventional optical fiber star coupler in which a large number of branches are realized by coupling 3-dB fiber couplers in a multi-stage manner. However, according to the present invention, no splicing point of the optical fibers is present between the 3-dB fiber couplers.

That is, since no splicing point of the optical fibers is present, the optical fibers are not locally frequently damaged, and variations in a branching ratio caused by a connection loss at the splicing points cannot be produced. Furthermore, when the optical fiber star coupler is manufactured in accordance with a manufacturing method of the present invention (to be described later), a slack optical fiber line for splicing the 3-dB fiber couplers can be reduced to the limit. As a result, a size of the entire optical fiber star coupler can be reduced.

BRIEF DESCRIPTION OF THE DRAWINGS

FIGS. 1(a) and 1(b) are plan and side views, respectively, showing an arrangement of a fiber coupler manufacturing apparatus according to the present invention;

FIGS. 2(a) and 2(b) are plan and side views and FIG. 2(c) is a sectional view taken along the line M—M of FIGS. 2(a) and 2(b), respectively, showing a member obtained by integrally forming five fiber couplers manufactured by the apparatus of FIGS. 1(a) and 1(b);

FIG. 3 is a graph showing wavelength dependency of coupling of the fiber coupler of FIGS. 2(a) to 2(c);

FIG. 4(a) is a plan view and FIG. 4(b) is a sectional view taken along the line N—N of FIG. 4(a), respectively, showing another embodiment of the fiber coupler according to the present invention;

FIGS. 5(a) is a plan view and FIG. 5(b) is a sectional view taken along the line O—O of FIG. 5(a), respectively, showing still another embodiment of the fiber coupler according to the present invention;

FIG. 6(a) is a plan view and FIG. 6(b) is a sectional view taken along the line P—P of FIG. 6(a), respectively, showing a still another embodiment of the fiber coupler according to the present invention;

FIGS. 12(a) to 12(j) are views schematically showing manufacturing steps of still another embodiment of the present invention;

FIG. 16 is a plan view showing a conventional star coupler; and

DETAILED DESCRIPTION OF THE PREFERRED EMBODIMENTS

Figure 7A:
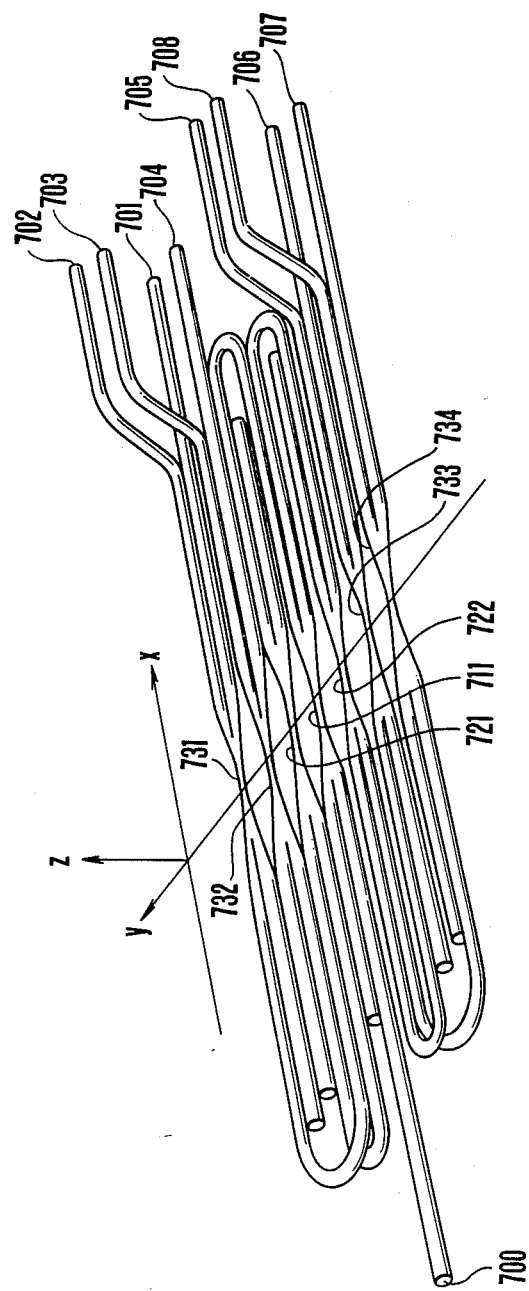
FIG. 7(a) is a perspective view showing an outer appearance of still another embodiment of the fiber coupler manufactured in accordance with the present invention.

The present invention will be described in detail below with reference to the accompanying drawings. Embodiments to be disclosed below are merely examples of the present invention and hence do not limit a technical scope of the present invention.

Embodiment 1

FIGS. 1(a) and 1(b) are views showing an arrangement of a fiber coupler manufacturing apparatus according to the present invention, in which FIG. 1(a) is a plan view wherein the apparatus is viewed from the above and FIG. 1(b) is a side view. Note that the following embodiment is an apparatus for manufacturing an element having five fiber couplers using two fiber ribbons having five fibers. In FIGS. 1(a) and 1(b), five fiber ribbons are mounted on the apparatus.

This apparatus is mainly constituted by a pair of elongation stages 11A and 11B and burners 12A and 12B.

The elongation stages 11A and 11B comprise fixing tools 111A and 111B for fixing a fiber ribbon (to be described later) including a coating, pairs of pin groups 112A–113A and 112B–113B for horizontally positioning a single bared fiber from which a coating is removed, and contacting tools 114A and 114B for vertically moving the bared fibers to perform vertical position setting, i.e., for bringing the bared fibers into tight contact with each other, respectively. Although driving means for the pair of elongation stages 11A and 11B are not shown, they can be moved along guides 120A and 120B by a uniform driving force so as to be separated from each other. Rolls 13A, 13B, 13C, and 13D are provided at one outside of each elongation stages, and tension is given to a fiber ribbon by tracting means (not shown) provided outside the rolls.

As pins of the pin groups 112A–113A and 112B–113B, piano wires having an outer diameter of 123 $\mu$m and a length of 2 mm are vertically fixed on the surfaces of the elongation stages 11A and 11B. The piano wires are arranged at an interval of 250 $\mu$m. The fixing tools 111A and 111B and the contacting tools 114A and 114B are arranged such that a single plate is urged against a plurality of bared fibers through elastic means and the fibers are fixed on or brought into contact with the surfaces of the elongation stages 11A and 11B. For this reason, a uniform load acts on a plurality of bared fibers as will be described later.

A fiber ribbon used in this embodiment is obtained by arranging five fibers in parallel and forming them integrally with urethane or acrylic ultraviolet-cured resin whose thickness is about 75 $\mu$m. The pitch of the fibers is 250 $\mu$m.

An operation of manufacturing an optical member having five sets of fiber couplers from the above fiber ribbons will be described below.

First, coatings of a pair of 5-core fiber ribbons 21 and 22 consisting of five bared fibers 21a, 21b, 21c, 21d, and 21e and 22a, 22b, 22c, 22d, and 22e, respectively, are removed in an amount corresponding to a distance of X—X in FIG. 1 by sulphuric acid.

Subsequently, the fiber ribbon 22 is positioned by the pin groups 112A–113A and 112B–113B so that the bared fibers 22a, 22b, 22c, 22d, and 22e are arranged at equal intervals. Then, the fiber ribbon 21 is placed on the fiber ribbon 22 and positioned by the pin groups 112A–113A and 112B–113B so that the bared fibers 21a, 21b, 21c, 21d, and 21e are arranged at equal intervals. Since the pins are arranged as described above, the bared fibers are separated from each other by a distance of about 125 $\mu$m, and a total width of the fiber ribbon is about 1.2 mm.

Then, the fiber ribbons 21 and 22 are fixed to the elongation stage 11A by the fixing tool 111A, and tension of about 50 g is applied to the fiber ribbons 21 and 22 through the rolls 13A, 13B, 13C, and 13D. Thereafter, the fiber ribbons 21 and 22 are fixed to the elongation stage 11B by the fixing tool 111B while maintaining the above state. That is, the fiber ribbons are fixed between the elongation stages 11A and 11B while maintaining tension of about 50 g. Note that the elongation stages 11A and 11B are fixed during this operation.

Then, the contacting tools 114A and 114B are operated so that corresponding bared fibers, i.e., in this embodiment, bared fibers corresponding to each other in a vertical direction of the fiber ribbons 21 and 22 are brought into contact with each other. That is, by pushing downward the contacting tools 114A and 114B, vertically corresponding bared fibers form sets of contacted fibers of 21a-22a, 21b-22b, 21c-22c, 21d-22d, and 21e-22e. Note that in FIG. 1, the contacting tool 114A is partially cut away to show the state of the bared fibers.

The bared fibers 21a-22a, 21b-22b, 21c-22c, 21d-22d, and 21e-22e are heated and fused with each other at substantially the central position of the fiber ribbon in which arrangement is completed and the bared fibers contact each other between the elongation stages 11A and 11B by the pair of burners 12A and 12B arranged above and below the fibers.

When it is confirmed that the bared fibers are fused with each other, outputs of the burners 12A and 12B are reduced and both the elongation stages 11A and 11B are moved away from each other at substantially the same speed so that the bared fibers are softened and elongated. In this manner, five sets of fiber couplers are manufactured by simultaneously operating five sets of bared fibers, and a detailed operation thereof will be described later.

In this method, a plurality of fused-elongated regions are elongated at the same time by the single elongation mechanism. Therefore, even if heating amounts applied to the respective fused-elongated regions are not completely the same, elongation amounts of the respective fused-elongated regions are defined by an elongation amount of the least heated fused-elongated region. For this reason, substantially the same elongation states of the fused-elongated regions are obtained, and hence a plurality of fiber couplers having substantially the uniform characteristics can be obtained.

In this operation, emission light from a semiconductor laser is injected from one end of the bared fiber 21a, and detectors 23 and 24 are coupled to the other end of the bared fiber 21a and an end of the bared fiber 22a which forms a pair together with the bared fiber 21a, thereby monitoring characteristics of the fiber coupler formed by an elongation operation.

That is, at an initial stage of the operation, no output is generated from the detector 24. When an elongation length becomes 5 to 30 mm, branching occurs for the first time, and the detector 24 generates an output. Therefore, by monitoring an output light intensity of the detectors 24 and 23 and stopping elongation/heating when a desired value is obtained, fiber couplers having desired characteristics can be obtained.

FIGS. 2(a) to 2(c) show a member obtained by integrally forming five fiber couplers manufactured as described above, in which FIG. 2(a) is a plan view, FIG. 2(b) is a side view, and FIG. 2(c) is a sectional view taken along the line M—M of FIGS. 2(a) and 2(b), respectively. That is, the bared fibers 21a-22a, 21b-22b, 21c-22c, 21d-22d, and 21e-22e of the fiber ribbons 21 and 22 form fiber couplers at the fused-elongated region 30, respectively. Reference numeral 31 represents cores in a section of the fused-elongated region 30. A plane including two cores 31 is substantially perpendicular to arrange planes of the fiber ribbons 21 and 22. These fiber couplers are kept coupled to the fiber ribbons and hence can be easily handled. When the fiber couplers are actually used, they are reinforced and then housed in a vessel so that no external force acts on the fused-elongated region 30.

FIG. 3 is a graph showing characteristics of the fiber coupler as described above, in which coupling ratio-wavelength characteristics of the fiber coupler for mixing/branching light having a wavelength of 1.3 $\mu$m and/from light having a wavelength of 1.55 $\mu$m are shown.

This graph shows results obtained by measuring the bared fibers 21a and 22a by the detectors 23 and 24. As is apparent from FIG. 3, this fiber coupler has a coupling ratio of 0.007 at a wavelength of 1.3 $\mu$m and a coupling ratio of 0.997 at a wavelength of 1.55 $\mu$m. That is, this fiber coupler has a function of mixing/branching light having a wavelength of 1.3 $\mu$m and/from that having a wavelength of 1.55 $\mu$m.

When the same characteristics are measured for other four fiber couplers, a coupling ratio in a wavelength of 1.3 $\mu$m falls within the range of 0.02±0.01 and a coupling ratio at a wavelength of 1.55 $\mu$m falls within the range of 0.98±0.01. That is, these five fiber couplers have the uniform characteristics. This means that a slight temperature distribution inevitably generated when the five bared fibers are heated/elongated poses practically no problem.

As described above, according to the manufacturing method of the present invention, in manufacture of five sets of fiber couplers, the five fiber couplers manufactured at the same time have substantially the same characteristics by performing on-line measurement of a coupling ratio of only one of them.

Note that in the above embodiment of FIG. 1, the primary and secondary optical fiber groups are heated from two directions, i.e., from the upper and lower directions. However, the fiber groups may be heated horizontally or through a given angle as long as they are substantially uniformly heated in the same longitudinal direction.

The portion of the fiber ribbon from which the over coating is removed is fixed in an optical fiber arrangement direction (x-axis direction) by positioning pins. However, any arrangement such as a groove or a V-groove may be used in the present invention as long as the optical fibers are fixed in the x direction while substantially maintaining intervals between the optical fibers in the axial direction as a fiber ribbon.

In the above description, the fiber ribbons are used as the primary and secondary optical fiber groups. However, when an arrangement in which a plurality of single-core optical fibers each obtained by coating a single optical fiber are aligned is used as both or one of the primary and secondary optical fiber groups, a plurality of fiber couplers having the uniform characteristics can be manufactured by the same manufacturing method and apparatus as in the above embodiment.

Embodiment 2

Using the 5-core fiber ribbon coupler manufacturing apparatus shown in FIG. 1, most general 3-dB fiber couplers are manufactured. A manufacturing operation and an arrangement of manufactured fiber couplers are basically the same as those in Embodiment 1 except for an elongation operation. That is, as in Embodiment 1, semiconductor laser light having a wavelength of 1.3 μm is injected into the bared fiber 21a as one of five sets of bare fibers and monitored at the other end of the bared fiber 21a and an end at the same side of the bared fiber 22a by the detectors 23 and 24, thereby heating/elongating the bared fibers.

A branching ratio of the five sets of fiber coupler groups thus manufactured falls within the range of 50%±1% and an insertion loss thereof falls within the range of 0.05±0.02 dB. That is, variations in characteristics are very small.

Embodiment 3

FIGS. 4(a) and 4(b) show a fiber coupler according to still another embodiment of the present invention, in which FIG. 4(a) is a plan view and FIG. 4(b) is a sectional view taken along the line N—N of FIG. 4(a). In this embodiment, only three out of five bared fibers of the fiber ribbon are fused as a fiber coupler.

That is, a pair of 5-core fiber ribbons 41 and 42 are arranged such that bared fibers 41a, 41b, and 41c correspond to bared fibers 42c, 42d, and 42e, respectively. Then, the bared fibers 41a–41e and 42a–42e are heated/elongated at the same time.

At this time, in addition to a fused region 43 for forming a fiber coupler, the bared fibers 41d, 41e, 42a, and 42b which are not fused to other bared fibers are elongated. However, a loss caused by this elongation is so small as to be considered not to have adversely affected light transmission characteristics.

Embodiment 4

In this embodiment, an operation for practicing the present invention using fiber ribbons having different numbers of cores.

That is, FIGS. 5(a) and 5(b) show a fiber coupler according to still another embodiment of the present invention, in which FIG. 5(a) is a plan view and FIG. 5(b) is a sectional view taken along the line O—O of FIG. 5(a). In this embodiment, a 10-core fiber ribbon 51 and 5-core fiber ribbons 52 and 53 are combined to prepare a coupler.

FIGS. 6(a) and 6(b) show a modification of the fiber coupler according to still another embodiment of the present invention, in which FIG. 6(a) is a plan view and FIG. 6(b) is a sectional view taken along the line P—P of FIG. 6(b). In this modification, 10-core fiber ribbons 61 and 62 and 5-core fiber ribbons 63 and 64 are combined to prepare a coupler.

Various types of optical fibers constituting the fiber coupler of the present invention can be combined for a fiber ribbon having a given number of bared fibers. In addition, it is a matter of course that a single-core fiber ribbon can be used. That is, the type of an optical fiber to be fused/elongated may be arbitrarily selected in accordance with an application.

Embodiment 5

FIG. 7(a) is a perspective view showing an outer appearance of an optical fiber star coupler manufactured in accordance with the present invention.

That is, this optical fiber star coupler has one input port 700 and eight output ports 701 to 708. Fused-elongated regions 711, 721, 722, 731, 732, 733, and 734 for a 3-dB branching operation are parallelly arranged in an x-axis direction of a coordinate system shown in FIG. 7(a), i.e., in a longitudinal direction of the optical fibers, and a line connecting centers of the fused-elongated regions extends in a direction perpendicular to the longitudinal direction of the optical fibers.

Figure 7B:
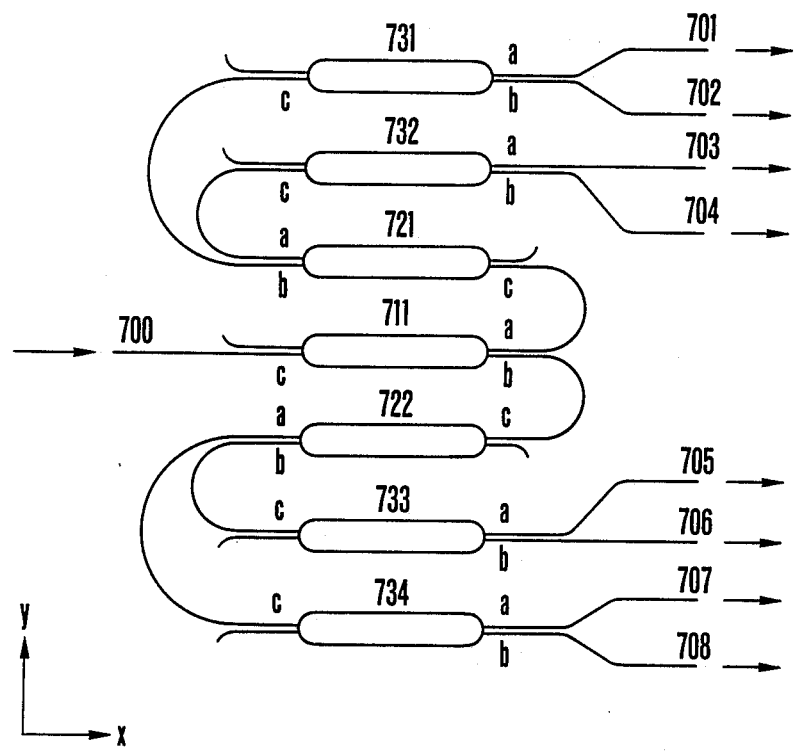
FIG. 7(b) is a plan view in which the fiber coupler of FIG. 7(a) is developed in a y-axis direction.

FIG. 7(b) is a schematic view obtained by developing the optical fiber star coupler shown in FIG. 7(a) in a y-axis direction for better understanding of an arrangement of the coupler as an optical circuit. In FIG. 7(b), input ports of fused-elongated regions 711, 721, 722, 731, 732, 733, and 734 are represented by c, and output ports thereof are represented by a and b, respectively.

As shown in FIG. 7(b), a light signal input from an input port 700 is incident on the fused-elongated region 711 at the first stage through the input port c and then branched and output from the output ports a and b. Subsequently, these light signals are incident on the fused-elongated regions 721 and 722 at the second stage from the input ports c and then branched and output from the output ports a and b, respectively. Thereafter, these light signals are incident on the fused-elongated regions 731, 732, 733, and 734 of the third stage from the input ports c and then branched and output to the output ports 701 to 708.

A total length of a branching circuit in an x direction of this optical fiber star coupler is substantially ⅓ that of the conventional optical fiber star coupler shown in FIG. 16, and almost no slack fiber is present in this star coupler. Therefore, the entire optical fiber star coupler is much smaller than the conventional one.

In accordance with a manufacturing method of the present invention to be described later, in this optical fiber star coupler, a light transmission line of input port 700→fused-elongated region 711(c-b)→fused-elongated region 722(c-a)→fused-elongated region 734(c-a)→output port 707 is formed of a continuous single optical fiber. Similarly, each of light transmission lines of fused-elongated region 711a→fused-elongated region 21(c-b)→fused-elongated region 731(c-b)→output port 702, fused-elongated region 721a→fused-elongated region 32(c-b)→output port 704, and fused-elongated region 722b→fused-elongated region 733(c-a)→output port 705 is formed of a continuous single optical fiber. In other words, the fused-elongated regions 711, 721, 722, 731, 732, 733, and 734 are coupled without coupling portions. As described above, an insertion loss of the optical fiber itself is at most 0.1 dB. Therefore, an insertion loss of the entire optical fiber star coupler as a whole is 9.3 dB or less which is a total sum of insertion losses of branching of three stages and the optical fiber itself. Light output power at the output ports 701 to 708 falls within the range of 9.2 dB±0.1 dB, i.e., is uniform.

A manufacturing method of the above optical fiber star coupler will be described below.

FIGS. 8(a) to 8(d) are views for explaining an arrangement of an apparatus for manufacturing the above optical fiber star coupler and a method of using the same.

Figures 8A, 8B, 8C, 8D:
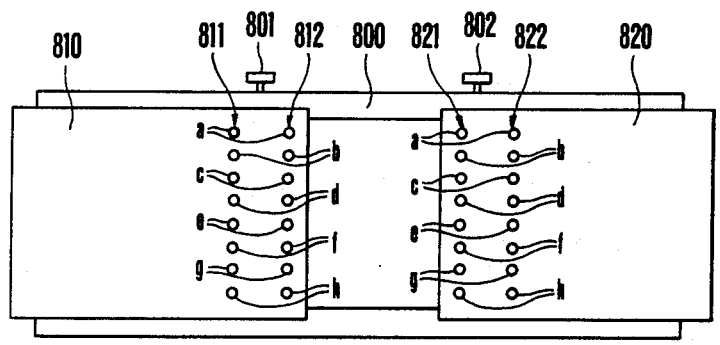
FIGS. 8(a) to 8(d) are plan views for explaining an arrangement and method of using an apparatus for manufacturing the fiber coupler of FIGS. 7(a) and 7(b)

As shown in FIG. 8(a), this apparatus includes a pair of elongation stages 810 and 820 placed on a guide member 800. The elongation stages 810 and 820 can be moved away from each other along the guide member 800 and can also be fixed at positions shown in FIG. 8(a) by screws 801 and 802, respectively. The elongation stages 810 and 820 have parallel pin arrays 811, 812, 821, and 822 each consisting of eight pins a to h on their upper surfaces, respectively. An optical fiber is inserted between the pins and horizontally positioned as will be described later.

In the apparatus of this embodiment, a diameter of each pin is 500 μm, and pins are arranged such that a pitch between the pins is 630 μm, i.e., an interval of 130 μm is obtained therebetween. In addition, an interval of 10 mm is provided between arrays 811 and 812 or between 821 and 822, and a height of the pins a to h is 2 mm.

These pins position the optical fibers to be parallel to each other and vertically stack them without offset therebetween as will be described later. The pins must be arranged such that bending stress and the like caused by curvature of a bent portion of the optical fiber is reduced. A structure such as grooves formed on the elongation stages in which the optical fibers are embedded can function similarly to the pins.

Subsequently, a method of using the above apparatus will be described below. A coating of at least a portion of an optical fiber is positioned between pins 811 and pins 812.

First, as shown in FIG. 8(b), four optical fibers 301a-b to 8304a-b are arranged so that each optical fiber is inserted between the pins. Subsequently, as shown in FIG. 8(c), four optical fibers 8311a-b to 8314a-b are arranged on the optical fibers 8301a-b to 8304a-b so as to be brought into contact therewith so that each second optical fiber is inserted between the pins.

In this case, various arrangements of the optical fibers can be made in consideration of the condition that at least one of end portions of the four optical fibers serves as an input port of a completed optical fiber star coupler (in this embodiment, the optical fiber 8301a at the left side of FIG. 8(b)) and at least eight end portions serve as output ports (in this embodiment, optical fibers 301b to 8304b and 8311b to 8314b at the right side of FIG. 8(c)).

That is, the first and second optical fibers are fused/elongated between the pin arrays 812 and 821 to form light branching portions. Therefore, optical fibers t to z in this section of FIG. 8(c) correspond to the fused-elongated regions 731, 732, 721, 711, 722, 733, and 734 of FIG. 7(b), respectively. The optical fibers 8304b, 8303b, 8302b, and 8301b between pins a and b, between b and c, between f and g, and between g and h in FIG. 8(b) correspond to the output ports 702, 704, 705, and 707 in FIG. 7(b), respectively. In addition, the optical fibers 8311b, 8312b, 8313b, and 8314b arranged on the optical fibers 8304b, 8303b, 8302b, and 8301b in FIG. 8(c) correspond to the output ports 701, 703, 706, and 708 in FIG. 7(b), respectively.

In order to reliably couple the fused-elongated regions formed by the optical fibers t to z shown in FIG. 8(c), the above optical fibers inserted through the pins form six bent portions In this embodiment, in a state shown in FIG. 7(b), a bent portion of the optical fiber from the pins b and c to c and d on the elongation stage 810, a bent portion of the optical fiber from the pins b and c to c and d on the elongation stage 810, and a bent portion of the optical fiber from the pins d and e to e and f on the elongation stage 820 correspond to three of the above six bent portions. In addition, in a state shown in FIG. 8(c), a bent portion of the optical fiber from the pins a and b to c and d on the elongation stage 810, a bent portion of the optical fiber from the pins e and f to f and g on the elongation stage 810, and a bent portion of the optical fiber from the pins c and d to d and e on the elongation stage 820 correspond to the remaining three bend portions.

In order to prevent an increase in a loss or a break in the optical fiber and to reduce torsion, flexure, or bending of the optical fiber, a slack is given to the optical fiber shown in FIGS. 8(b) and 8(c) so that curvature of 10 mm or more is obtained at the bent portion.

Constant tension falling within the range of 0.5 g to 50 g is given by a tension control tool (not shown) so that the optical fibers 8301 to 8304 and 8311 to 8314 are not bent between at least the pin arrays 811 and 821. In order to maintain this state, the optical fibers are fixed on the guide 800 by adhesive portions 8401 and 8402 as shown in FIGS. 8(d). Weights 813 and 823 are placed between the pin arrays 811 and 812 and between 821 and 822, respectively, so that vertically stacked optical fibers are brought into contact with each other.

Figure 9:
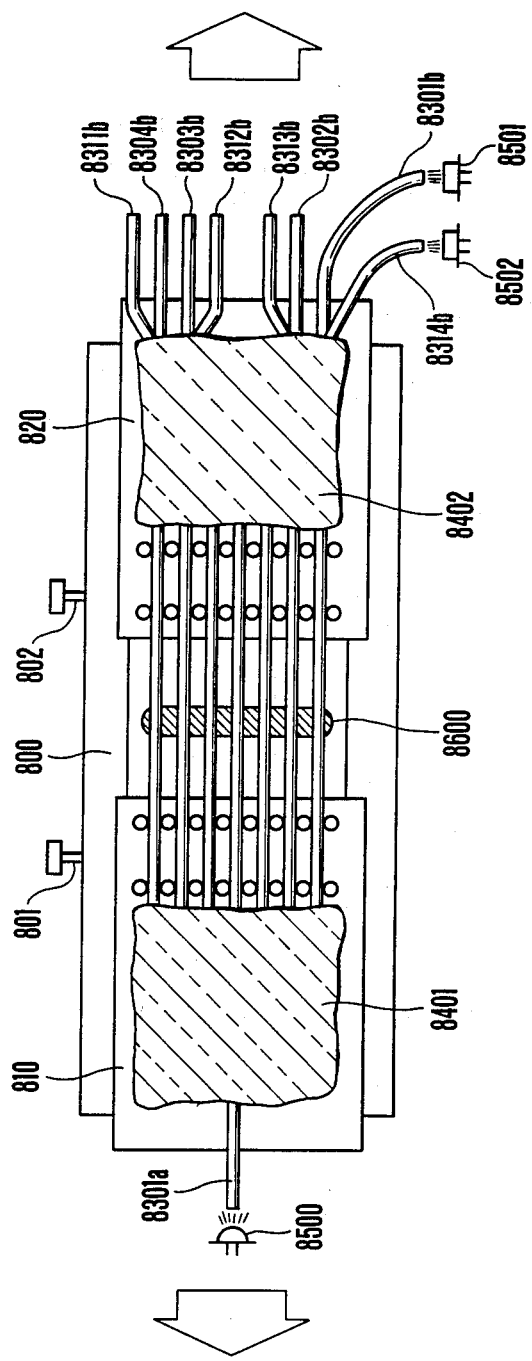
FIG. 9 is a plan view for explaining a fusing/elongating step of the fiber coupler arranged as shown in FIG. 8(d)

FIG. 9 is a view for explaining a fusing/elongating step of the optical fibers arranged as described above. FIG. 9 shows an arrangement essentially the same as that shown in FIG. 8(d) but in a different scale.

A light-emitting element 8500 is arranged at an end of the optical fiber 8301a, and detectors 8501 and 8502 are arranged at ends of, e.g., the optical fibers 8301b and 8314b, respectively. These element and detectors are arranged to monitor a coupling state of the optical fibers in a fusing/elongating step to be described below.

Subsequently, the optical fibers are heated/melted by a burner arranged between the elongation stages 810 and 820. As described above, since the optical fibers contact each other at this portion, the vertically stacked optical fibers are fused with each other. Then, a heating amount is controlled to maintain a softening state of the optical fibers, and at the same time, the screws 801 and 802 are loosened and the elongation stages 810 and 820 are moved away from each other along the guide 800 by a tracting force of 1 to 10 g.

As shown in FIG. 8(b), the optical fibers 8301a and 8301b are both ends of a continuous single optical fiber. Therefore, at an initial stage of the above operation, substantially all the light signals injected from the light-emitting element 8500 into the optical fiber 8301a are output to the optical fiber 8301b. As elongation progresses, optical coupling is produced at the fused-elongated portions of the optical fibers, and a light output appears in the optical fiber 8314b. Therefore, when an output from the optical fiber 8314b detected by the detector 8502 reaches a predetermined amount, elongation is stopped. At this time, the optical fibers t to z are fused/elongated at the same time under the same conditions.

As a result, the optical fiber star coupler as shown in FIG. 7(a) is completed. In an actual operation, this optical fiber star coupler is housed in a protecting case.

When a branching ratio of the optical fiber star coupler manufactured as described above, loss values at eight branched ends fall within the range of 9.1±0.05 dB, and the fused-elongated regions have the uniform characteristics.

In other words, monitoring of the elongating step performed by injecting light as described above need not be performed to all the output optical fibers.

In this embodiment, the optical fiber, from which the coating is removed, is used to manufacture the optical fiber star coupler. However, the coating need be removed at only the fused-elongated region. Therefore, the coating at only the fused-elongated region may be removed by chemicals after the optical fiber is fixed on the apparatus.

An arrangement of the optical fibers is not limited to that of this embodiment. In addition, a vertical relationship of the optical fibers to be arranged may be arbitrarily changed at the bent portion.

In this embodiment, the 8-branch type optical fiber star coupler and its manufacturing method have been described, but the present invention is not limited thereto. That is, not only a $2^n$-branch type, e.g., 4-, 16-, 32-, 64-, or 128-branch type optical fiber star coupler but also an optical fiber star coupler having an arbitrary number of branches or branch ratio can be realized in accordance with the present invention.

Embodiment 6

A coupling ratio of the fiber couplers manufactured in accordance with Embodiments 1 to 5 periodically varies between 0 and 1 with respect to a wavelength.

Such characteristics having wavelength dependency of a coupling ratio are effective in a WD-multiplexer. However, it is difficult to apply the characteristics to a fiber coupler for branching light having a plurality of wavelengths in substantially the same coupling ratio. For this application, a fiber coupler having low wavelength dependency of a coupling ratio is preferred.

Figure 14A:
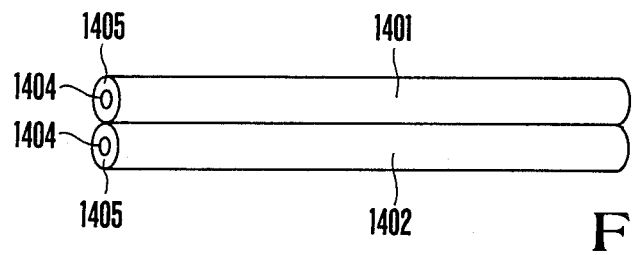
FIGS. 14(a) to 14(c) are views for explaining an arrangement and manufacturing method of a conventional fiber coupler.
Figure 14B:
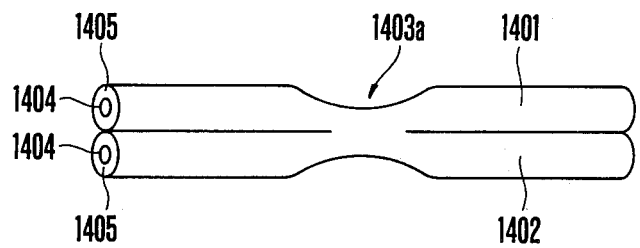
Figure 14C:
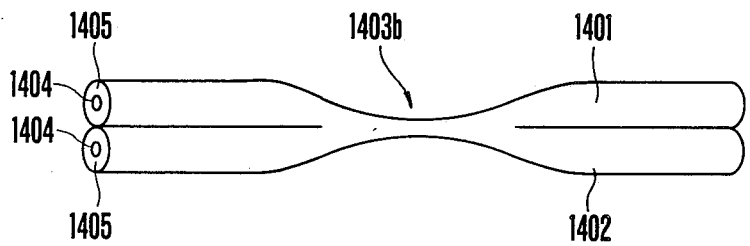
Figure 15:
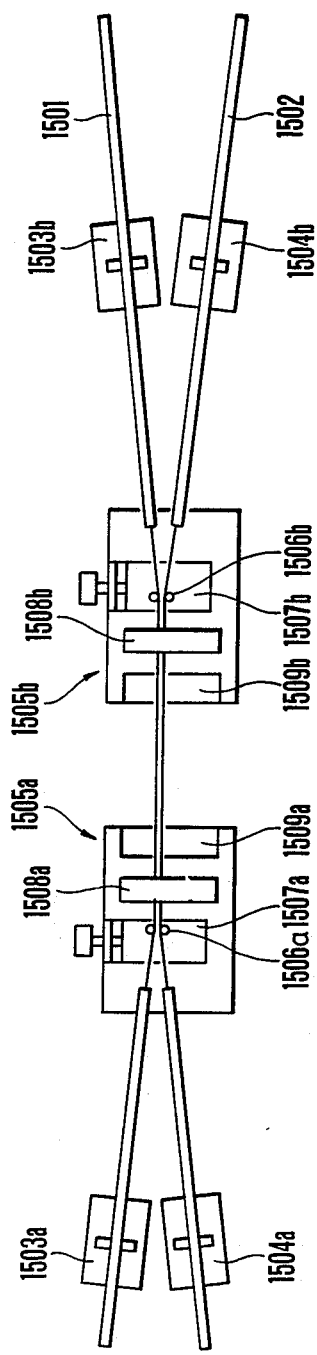
FIG. 15 is a plan view showing an apparatus for manufacturing the fiber coupler of FIGS. 14(a) to 14(c)
Figure 17:
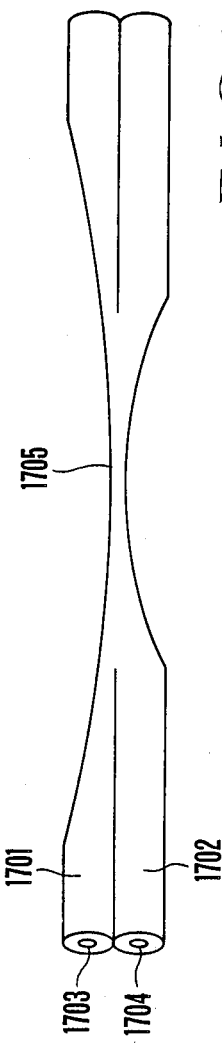
FIG. 17 is a schematic view showing an arrangement of a conventional single-core fiber coupler having low wavelength dependency of a coupling ratio.

FIG. 17 is a schematic view of an arrangement of a conventional fiber coupler having low wavelength dependency of a coupling ratio. This fiber coupler is manufactured by elongating an optical fiber 1701 and fusing/elongating an elongated region of the optical fiber 1701 and a portion of an optical fiber 1702 in its longitudinal direction in the same manner as shown in FIGS. 14(a) to 14(c). In FIG. 17, reference numerals 1703 and 1704 represent cores of the optical fibers 1701 and 1702, respectively, and reference numeral 1705 represents a fused-elongated region. In this arrangement, since core diameters at the fused-elongated region of the optical fibers 1701 and 1702 are different from each other, light coupling of a non-symmetrical light waveguide line is generated, i.e., complete coupling is not achieved. As a result, wavelength dependency of a coupling ratio can be reduced (reference: D. B. Mortimore, Electronics Letters, Vol. 21, PP. 742-743, 1985).

However, a large number of fiber couplers must be used in order to construct the optical system. Therefore, if the above operation is performed to each fiber coupler, productivity of the fiber couplers is largely degraded.

In this embodiment, a plurality of fiber couplers having low wavelength dependency are manufactured at the same time.

FIGS. 10(a) to 10(j) are schematic views for explaining manufacturing steps of this embodiment. In this embodiment, 5-core fiber ribbons 91 and 92 are used.

Figure 10A:
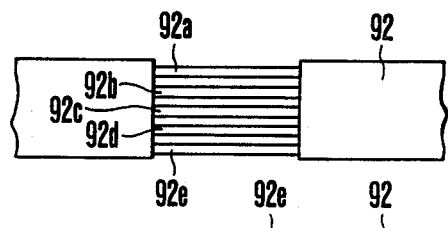
FIGS. 10(a) to 10(j) are views schematically showing manufacturing steps of still another embodiment of the fiber coupler according to the present invention.
Figure 10B:

First, as shown in FIGS. 10(a) and 10(b), a coating of the fiber ribbon 92 is removed throughout a predetermined portion in the same longitudinal direction. Then, exposed bared fibers 92a, 92b, 92c, 92d, and 92e are parallelly arranged on the same plane, thereby forming an optical fiber group.

Figure 10C:
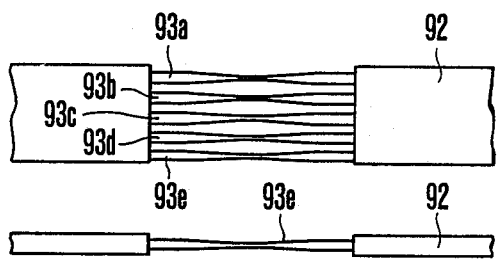
Figure 10D:

Subsequently, a portion of the exposed bared fibers 92a to 92e of this first optical fiber group is heated/elongated to form the first optical fiber group as shown in FIGS. 10(c) and 10(d). In FIGS. 10(c) and 10(d), reference numerals 93a, 93b, 93c, 93d, and 93e represent elongated bared fibers.

Subsequently, a coating of the fiber ribbon 91 is removed throughout a predetermined portion in the same longitudinal direction. Then, exposed bared fibers 91a, 91b, 91c, 91d, and 91e are arranged on the plane parallel to an arrange plane of the first optical fiber group so that they are aligned parallel to the elongated bared fibers 93a to 93e of the first optical fiber group at the same pitch, thereby forming a second optical fiber group.

Figure 10E:
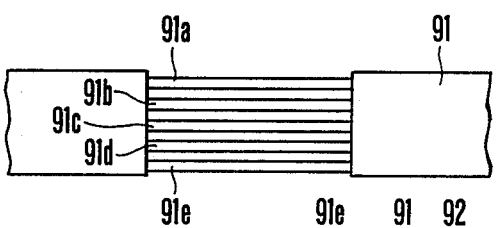
Figure 10F:

Thereafter, as shown in FIGS. 10(e) and 10(f), the exposed bared fibers 91a to 91e of the second optical fiber group are correspondingly brought into contact with the elongated bared fibers 93a to 93e of the first optical fiber group.

Figure 10G:
Figure 10H:
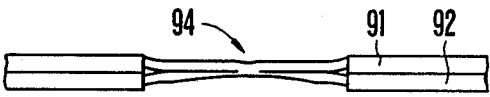

Then, both the bared fiber groups are heated at the same time so that the elongated bared fibers 93a to 93e of the first optical fiber group are correspondingly fused with the exposed bared fibers 91a to 91e of the second optical fiber group as shown in FIGS. 10(g) and 10(h). In FIGS. 10(g) and 10(h), reference numeral 94 represents a fused region.

Figure 10I:
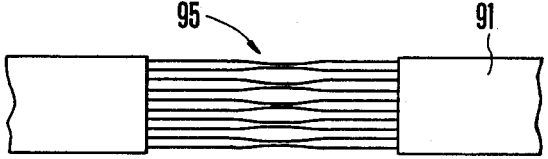
Figure 10J:

Subsequently, the fused region 94 is heated and elongated. When desired characteristics are obtained, elongation is stopped, and five fiber couplers are formed as shown in FIGS. 10(i) and 10(j). In FIGS. 10(i) and 10(j), reference numeral 95 represents a fused-elongated region.

In order to perform the above steps, the apparatus shown in FIGS. 1(a) and 1(b). These steps are performed following the same procedures as in Embodiment 1 except that the first optical fiber group is elongated beforehand.

In this embodiment, the fiber ribbons are used as the first and second optical fiber groups. However, any arrangement such as the star coupler shown in Embodiment 5 may be used as long as the first and second optical fiber coupler groups can be formed to manufacture a plurality of fiber couplers having low wavelength dependency of a coupling ratio at the same time.

Figure 11:
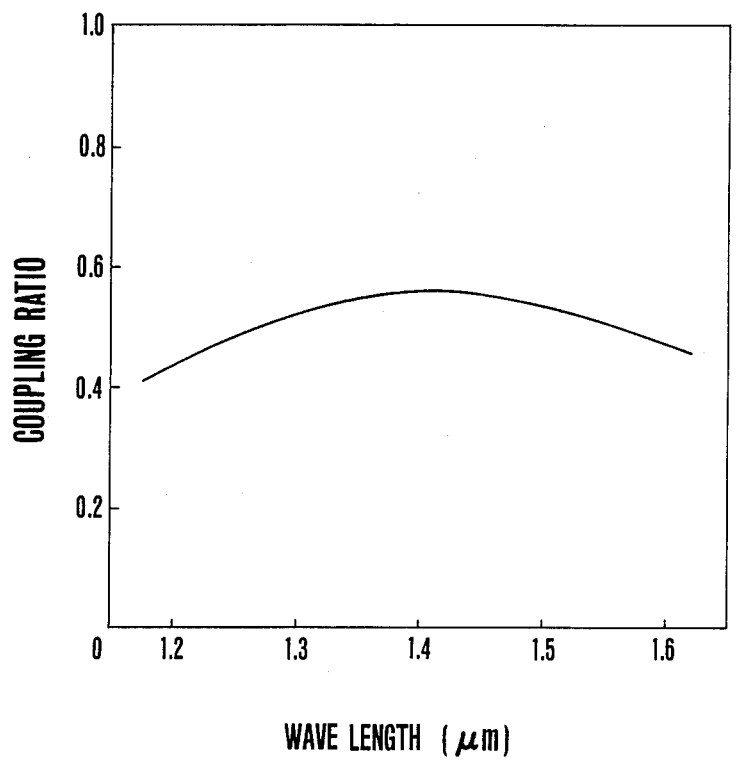
FIG. 11 is a graph showing wavelength dependency of a coupling ratio of the fiber coupler according to the present invention.

FIG. 11 is a graph showing wavelength dependency of a coupling ratio of the fiber coupler according to the present invention as described above. As is apparent from FIG. 11, a wavelength falls within the range of 1.2 μm to 1.6 μm, and a coupling ratio falls within the range of 0.4 to 0.6. This means that the fiber coupler manufactured in this embodiment has low wavelength dependency of a coupling ratio. That is, in FIG. 3, coupling ratios of the five fiber couplers manufactured at the same time by the present invention fall within the range of $0.52\pm0.01$ at a wavelength of 1.3 μm and within the range of $0.50\pm0.01$ at a wavelength of 1.55 μm. This means that the five fiber couplers have the uniform characteristics.

Embodiment 7

Variations in coupling ratio of the fiber couplers manufactured in accordance with the present invention depend on variations in tension applied on the bared fibers when corresponding bared fibers of the first and second optical fiber groups are brought into contact with each other. This embodiment relates to a manufacturing method of increasing uniformity of a coupling ratio of a plurality of fiber couplers manufactured at the same time.

FIGS. 12(a) to 12(j) schematically show manufacturing steps of this embodiment. In this embodiment, 5-core fiber ribbons 1201 and 1202 are used.

Figure 12A:
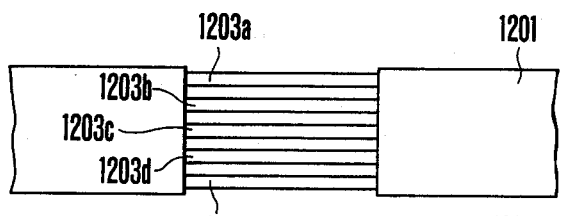
Figure 12B:
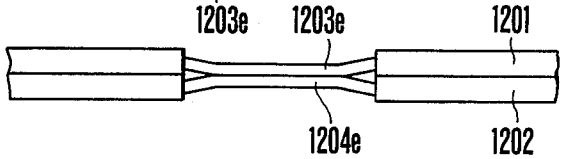

First, as shown in FIGS. 12(a) and 12(b), coatings of the fiber ribbons 1201 and 1202 are removed throughout predetermined portions in the same longitudinal direction. Then, exposed bared fibers 1203a–e and 1204a–e are parallelly arranged so that corresponding bared fibers are brought into contact with each other.

Figure 12C:
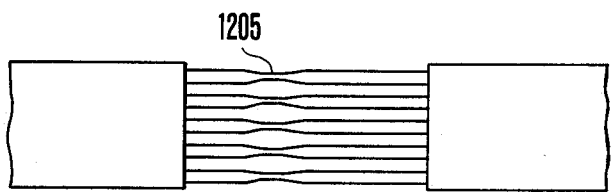
Figure 12D:
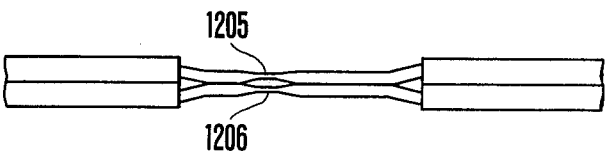

Subsequently, portions of the contacted bared fiber groups 1203a–e and 1204a–e in the longitudinal direction are heated so that the bared fiber groups 1203a–e and 1204a–e are softened and then elongated by tension, thereby forming first elongated regions 1205 and 1206 as shown in FIGS. 12(c) and 12(d). In this step, even if variations are present in tension applied on the bared fiber groups 1203a–e and 1204a–e in the state shown in FIGS. 12(a) and 12(b), the variations are reduced by elongation. As a result, variations in tension in the state shown in FIGS. 12(c) and 12(d) are very small.

Figure 12E:
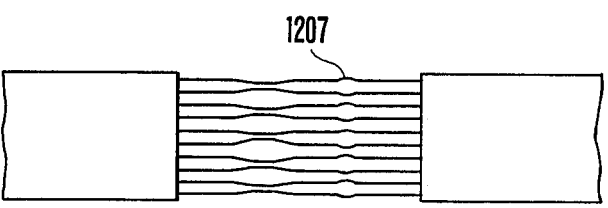
Figure 12F:
Figure 12G:
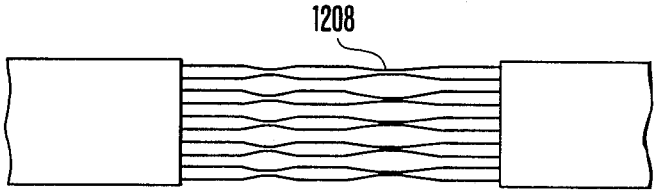
Figure 12H:
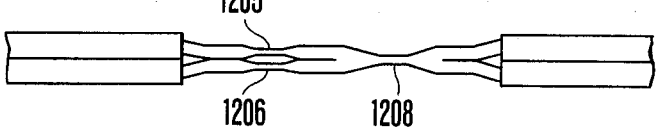
Figure 13:
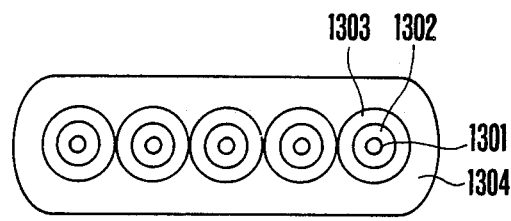
FIG. 13 is a sectional view of a conventional fiber ribbon.

Thereafter, as shown in FIGS. 12(e) and 12(f), the bared fiber groups at portions different from those of the first elongated regions 1205 and 1206 in the same longitudinal direction are heated/fused to form a fused region 1207.

Subsequently, the fused region 1207 is heated/elongated to form a fused-elongated region 1208. When desired characteristics are obtained, elongation is stopped, and five fiber couplers are completed.

In order to perform the above steps, the manufacturing apparatus shown in FIGS. 1(a) and 1(b) is used. These manufacturing steps are performed following the same procedures as in Embodiment 1 except that the portions in the longitudinal direction of the bared fiber groups are elongated after the corresponding bared fibers of the first and second optical fiber groups are brought into contact with each other.

When a fiber coupler for mixing/branching light having a wavelength of 1.3 μm and/from light having a wavelength of 1.5 μm is manufactured in accordance with this embodiment as in Embodiment 1, a coupling ratio at a wavelength of 1.3 μm falls within the range of 0.015±0.005 and a coupling ratio at a wavelength of 1.5 μm falls within the range of 0.990±0.005. That is, the five fiber couplers have the uniform characteristics. Since this uniformity is better than that obtained in Embodiment 1, it is confirmed that the manufacturing method of this embodiment is effective. The manufacturing method of this embodiment is also effective when variations in tension applied on the first and/or second bared fiber groups are large for some reason.

Furthermore, according to the present invention, an optical fiber can be manufactured by the following method. Two sets of coated multi optical fibers are prepared. A coating of a predetermined portion of each of the two sets is removed, the optical fibers of each set are arranged on a single plane, and the optical fibers of the two sets are arranged so that the optical fibers of one of the two sets are brought into contact with the optical fibers of the other set in 1:1 correspondence. At least one of the two sets which are fused by the optical fibers of different sets contacted in 1:1 correspondence is tracted to elongate the set, thereby coupling the two sets of optical fibers.

As has been described above, according to the present invention, a plurality of fiber couplers having uniform characteristics can be manufactured at the same time. In other words, the fiber couplers manufactured in accordance with the present invention can be easily formed into a plurality of products having uniform characteristics.

According to the manufacturing method of the fiber coupler of the present invention, two optical fiber groups positioned parallel to each other on the single plane are brought into contact with each other and then heated and fused/elongated at the same time. Therefore, various factors according to these operations such as variations in a side pressure or tension applied on the optical fibers uniformly act on all the optical fibers in the respective groups. As a result, the manufactured fiber couplers have the uniform characteristics.

In addition, when the manufacturing apparatus of the fiber coupler according to the present invention is used, fusing and elongating steps which are most time-consuming in manufacture of the fiber coupler can be performed at the same time. Therefore, a time required for manufacturing a plurality of fiber couplers can be largely reduced, thereby realizing high productivity.

Note that the fiber coupler and the fiber coupler manufacturing method according to the present invention are effective especially when a fiber ribbon is used as a material. In this case, characteristics of a plurality of fiber couplers manufactured at the same time can be further uniformed. Therefore, since a strong demand has arisen for high density transmission in a recent communication technique, a fiber ribbon which is expected to realize this demand can be used as a more practical material.

According to the above effects of the present invention, mass production which cannot be realized in conventional fiber coupler manufacturing method can be realized. In addition, a price of the fiber coupler can be reduced from 100,000 or more to several thousands yen per coupler. Furthermore, according to the present invention, since a plurality of fiber couplers have the uniform characteristics, they can be applied to various fields such as a public optical communication tap or a characteristic test circuit monitor.

What is claimed is:

1. A fiber coupler comprising:

a first optical fiber group obtained by parallelly arranging a plurality of optical fibers on a single plane, a coating of each of said optical fibers being removed throughout a predetermined portion at the same position as that of an adjacent optical fiber in a longitudinal direction;

a second optical fiber group obtained by parallelly arranging adjacent optical fibers on a predetermined plane parallel to an arrange plane of said first optical fiber group at the same pitch as that of said first optical fiber group, a coating of each of said optical fibers being removed throughout a predetermined portion at the same position as that of an adjacent optical fiber in a longitudinal direction as said first optical fiber group; and a fused-elongated region, located at a portion of said predetermined portions from which said coatings are removed, and obtained by fusing and elongating at least some optical fibers of said first optical fiber group with at least some optical fibers of said second optical fiber group so that corresponding optical fibers are fused and elongated;

wherein a plane including centers of two cores of said optical fibers fused with each other at said fused-elongated region is arranged substantially perpendicular to the arrange planes of said first and second optical fiber groups, and at least a portion of said first and second optical fiber groups is a fiber ribbon obtained by integrally forming a plurality of optical fibers each having a core and a cladding by a coating.

2. A fiber coupler comprising:
a first optical fiber group obtained by parallelly arranging a plurality of optical fibers on a single plane, a coating of each of said optical fibers being removed throughout a predetermined portion at the same position as that of an adjacent optical fiber in a longitudinal direction;
a second optical fiber group obtained by parallelly arranging adjacent optical fibers on a predetermined plane parallel to an arrange plane of said first optical fiber group at the same pitch as that of said first optical fiber group, a coating of each of said optical fibers being removed throughout a predetermined portion at the same position as that of an adjacent optical fiber in a longitudinal direction as said first optical fiber group; and
a fused-elongated region, located at a portion of said predetermined portions from which said coatings are removed, and obtained by fusing and elongating at least some optical fibers of said first optical fiber group with at least some optical fibers of said second optical fiber group so that, corresponding optical fibers are fused and elongated,
wherein a plane including centers of two cores of said optical fibers fused with each other at said fused-elongated region is arranged substantially perpendicular to the arrange planes of said first and second optical fiber groups, and a plurality of portions of said coating removed portion of said first and second fiber groups are portions of at least one continuous optical fiber.

3. A method of manufacturing a fiber coupler comprising the steps of:
arranging a plurality of optical fibers, coatings of which are removed throughout predetermined portions at the same position in a longitudinal direction to expose bared fibers, so that portions of said exposed bared fibers are arranged parallel to each other on a single plane, thereby forming a first optical fiber group;
arranging a plurality of optical fibers, coatings of which are removed throughout predetermined portions at the same position in the longitudinal direction as that of said first optical fiber group to expose bared fibers on a predetermined plane parallel to the arrange plane of said first optical fiber group so that portions of said exposed bared fibers are aligned parallel to said portions of exposed bared fibers of said first optical fiber group at the same pitch, thereby forming a second optical fiber group;
bringing corresponding bared fibers of said first and second optical fiber groups into contact with each other so that a plane including core centers of both the bared fibers is arranged substantially perpendicular to the arrange planes of said first and second optical fiber groups, and heating portions of the bared fiber groups in the longitudinal direction of said first and second optical fiber groups to fuse the corresponding bared fibers of said first and second optical fiber groups; and
heating and elongating said fused regions while applying tension to said fused regions, thereby forming a plurality of fiber couplers at the same time.

4. A method of manufacturing a fiber coupler comprising the steps of:
arranging a plurality of optical fibers, coatings of which are removed throughout predetermined portions at the same position in a longitudinal direction to expose bared fibers so that portions of said exposed bared fibers are arranged parallel to each other on a single plane, thereby forming a first optical fiber group;
arranging a plurality of optical fibers, coatings of which are removed throughout predetermined portions at the same position in the longitudinal direction as that of said first optical fiber group to expose fibers on a predetermined plane parallel to the arrange plane of said first optical fiber group so that portions of said bared fibers are aligned parallel to said exposed bared fiber portions of said first optical fiber group at the same pitch, thereby forming a second optical fiber group;
bringing corresponding bared fibers of said first and second optical fiber groups into contact with each other so that a plane including core centers of both the bared fibers is arranged substantially perpendicular to the arrange planes of said first and second optical fiber groups, and heating portions of the bared fiber groups in the longitudinal direction of said first and second optical fiber groups to soften said bared fiber groups while applying tension to said bared fiber groups to perform first elongation;
heating portions of said bared fiber groups, a diameter of which is not reduced by said first elongation, of said first and second optical fiber groups in the longitudinal direction to fuse the corresponding bared fibers of said first and second optical fiber groups; and
heating and elongating said fused region while applying tension to said fused region, thereby forming a plurality of fiber couplers at the same time.

5. A method for manufacturing a fiber coupler further comprising the steps of:
arranging a plurality of optical fibers, coatings of which are removed throughout predetermined portions at the same position in a longitudinal direction to expose fibers so that portions of said bared fibers are arranged parallel to each other on a single plane, and heating portions of said bared fibers in the longitudinal direction to soften said bared fiber groups at the same time while applying tension to said bared fiber groups to elongate said bared fiber groups, thereby forming a first optical fiber group;
arranging a plurality of optical fibers, coatings of which are removed throughout predetermined portions at the same position in the longitudinal direction as that of said first optical fiber group to expose fibers on a predetermined plane parallel to the arrange plane of said first optical fiber group so that portions of said bared fibers are aligned parallel to said exposed bared fiber portions of said first optical fiber group at the same pitch, thereby forming a second optical fiber group;

bringing corresponding bared fibers of said first and second optical fiber groups into contact with each other so that a plane including core centers of both the bared fibers is arranged substantially perpendicular to the arrange planes of said first and second optical fiber groups, and heating portions of the bared fiber groups of said first optical fiber group, a diameter of which is reduced by elongation, in the longitudinal direction of the bared fiber groups of said first and second optical fiber groups to fuse the corresponding bared fibers of said first and second optical fiber groups; and heating and elongating said fused region while applying tension to said fused region, thereby forming a plurality of fiber couplers at the same time.

6. A fiber coupler manufacturing apparatus for removing coatings of corresponding optical fibers of first and second optical fiber groups to expose fibers and coupling said bared fiber portions to manufacture a plurality of fiber couplers, comprising:

holding means for parallelly holding the exposed bared fiber portions of said first optical fiber group on a single plane at a predetermined pitch, and holding the exposed bared fiber portions of said second optical fiber group so that the exposed bared fiber portions are aligned parallel to the corresponding exposed bared fiber portions of said first fiber group at the same pitch;

contacting means for bringing the corresponding bared fiber portions of said first and second optical fiber groups into contact with each other so that a plane including core centers of both the bared fiber portions is arranged substantially perpendicular to arrange planes of said first and second optical fiber groups; and heating means for fusing and elongating the contacted bared fibers of said first and second fiber groups, wherein said holding means is formed on a pair of stages which can be moved relative to each other in an axial direction of the optical fiber group to be held.

* * * * *

UNITED STATES PATENT AND TRADEMARK OFFICE
CERTIFICATE OF CORRECTION

PATENT NO. : 4,869,570
DATED : 9/26/89
INVENTOR(S) : Yokohama et al.

It is certified that error appears in the above-identified patent and that said Patent is hereby corrected as shown below:

| col. 07, line 16 | after "coupling" | insert --ratio-- |
| col. 12, line 47 | delete "21" | insert --721-- |
| col. 12, line 50 | delete "32" | insert --732-- |
| col. 13, line 32 | delete "301" | insert --8301-- |
| col. 13, line 45 | delete "301" | insert --8301-- |
| col. 18, line 39 | after "from" | insert --¥-- |

Signed and Sealed this

Third Day of May, 1994

Attest:

BRUCE LEHMAN

*Attesting Officer*  *Commissioner of Patents and Trademarks*